(12) United States Patent
Kutz et al.

(10) Patent No.: US 10,563,644 B2
(45) Date of Patent: Feb. 18, 2020

(54) DEVICE FOR IMPROVING THE VACUUM IN THE HOUSING OF A MACHINE

(71) Applicants: Messer Industriegase GmbH, Bad Soden (DE); MESSER Group GmbH, Bad Soden (DE)

(72) Inventors: Thomas Kutz, Brüggen-Born (DE); Friedhelm Herzog, Krefeld (DE)

(73) Assignees: Messer Industriegase GmbH, Bad Soden (DE); Messer Group GmbH, Bad Soden (DE)

( * ) Notice: Subject to any disclaimer, the term of this patent is extended or adjusted under 35 U.S.C. 154(b) by 302 days.

(21) Appl. No.: 15/518,083

(22) PCT Filed: Oct. 5, 2015

(86) PCT No.: PCT/EP2015/072895
§ 371 (c)(1),
(2) Date: May 30, 2017

(87) PCT Pub. No.: WO2016/055398
PCT Pub. Date: Apr. 14, 2016

(65) Prior Publication Data
US 2017/0306940 A1    Oct. 26, 2017

(30) Foreign Application Priority Data

Oct. 10, 2014   (DE) .................. 10 2014 015 172

(51) Int. Cl.
*F04B 37/08*    (2006.01)
*F03G 3/08*    (2006.01)
(Continued)

(52) U.S. Cl.
CPC ............ *F04B 37/085* (2013.01); *B01D 53/04* (2013.01); *F03G 3/08* (2013.01); *F04B 37/08* (2013.01);
(Continued)

(58) Field of Classification Search
CPC . H02K 7/02; H02K 7/09; H02K 55/00; F04B 37/085; F04B 37/08; F03G 3/08;
(Continued)

(56) References Cited

U.S. PATENT DOCUMENTS 3,310,227 A * 3/1967 Milleron .................. F04F 9/00
96/4
4,766,741 A   8/1988 Bartlett et al.
(Continued)

FOREIGN PATENT DOCUMENTS

DE    19709674 C1    2/1998
DE    10357916 A1    3/2004
(Continued)

OTHER PUBLICATIONS

German Office Action, and translation, in corresponding DE Application No. 10 2014 015 172.7, dated Jul. 6, 2015.
(Continued)

*Primary Examiner* — Michael Andrews
(74) *Attorney, Agent, or Firm* — Andrus Intellectual Property Law, LLP

(57) ABSTRACT

The disclosure relates to a device for improving a vacuum in the housing of a machine, in particular a centrifugal-mass energy store, comprising a rotor, for example a shaft having a centrifugal mass arranged thereon, which rotor is supported on at least one superconducting bearing in a contactless manner and is arranged in a vacuum container. In order to maintain the operating state of the superconducting bearing, the superconducting bearing is thermally connected to a cold source cooled by a cryogenic medium. According to the invention, the vacuum in the vacuum container is improved by means of an adsorber thermally connected to a (Continued)

cooling apparatus. The cooling of the adsorber occurs preferably by means of evaporated cooling medium from the superconducting bearing.

20 Claims, 1 Drawing Sheet

(51) Int. Cl.
*B01D 53/04* (2006.01)
*F16C 32/04* (2006.01)
*H01F 6/04* (2006.01)

(52) U.S. Cl.
CPC .......... *F16C 32/0438* (2013.01); *H01F 6/04* (2013.01); *F16C 2300/62* (2013.01); *F16C 2361/55* (2013.01)

(58) Field of Classification Search
CPC ....... B01D 53/04; H01F 6/04; F16C 32/0438; F16C 2300/62; F16C 2361/55
USPC .................................................. 310/74, 90.5
See application file for complete search history.

(56) References Cited

U.S. PATENT DOCUMENTS

| | | | |
|---|---|---|---|
| 5,462,402 A | 10/1995 | Bakholdin et al. | |
| 2004/0182091 A1* | 9/2004 | Wang | F25B 25/005 |
| | | | 62/55.5 |
| 2014/0137571 A1 | 5/2014 | Petroff et al. | |

FOREIGN PATENT DOCUMENTS

| | | |
|---|---|---|
| JP | 2008086095 A | 4/2008 |
| WO | 2012031790 A1 | 3/2012 |
| WO | 2013149625 A1 | 10/2013 |

OTHER PUBLICATIONS

International Search Report for corresponding International Application PCT/EP2015/072895, dated Feb. 2, 2016, published in WO 2016/055398 A1 on Apr. 14, 2016.
English Translation of the Written Opinion of the International Searching Authority for corresponding International Application PCT/EP2015/072895, dated Feb. 2, 2016, translated to English Feb. 1, 2017.

* cited by examiner

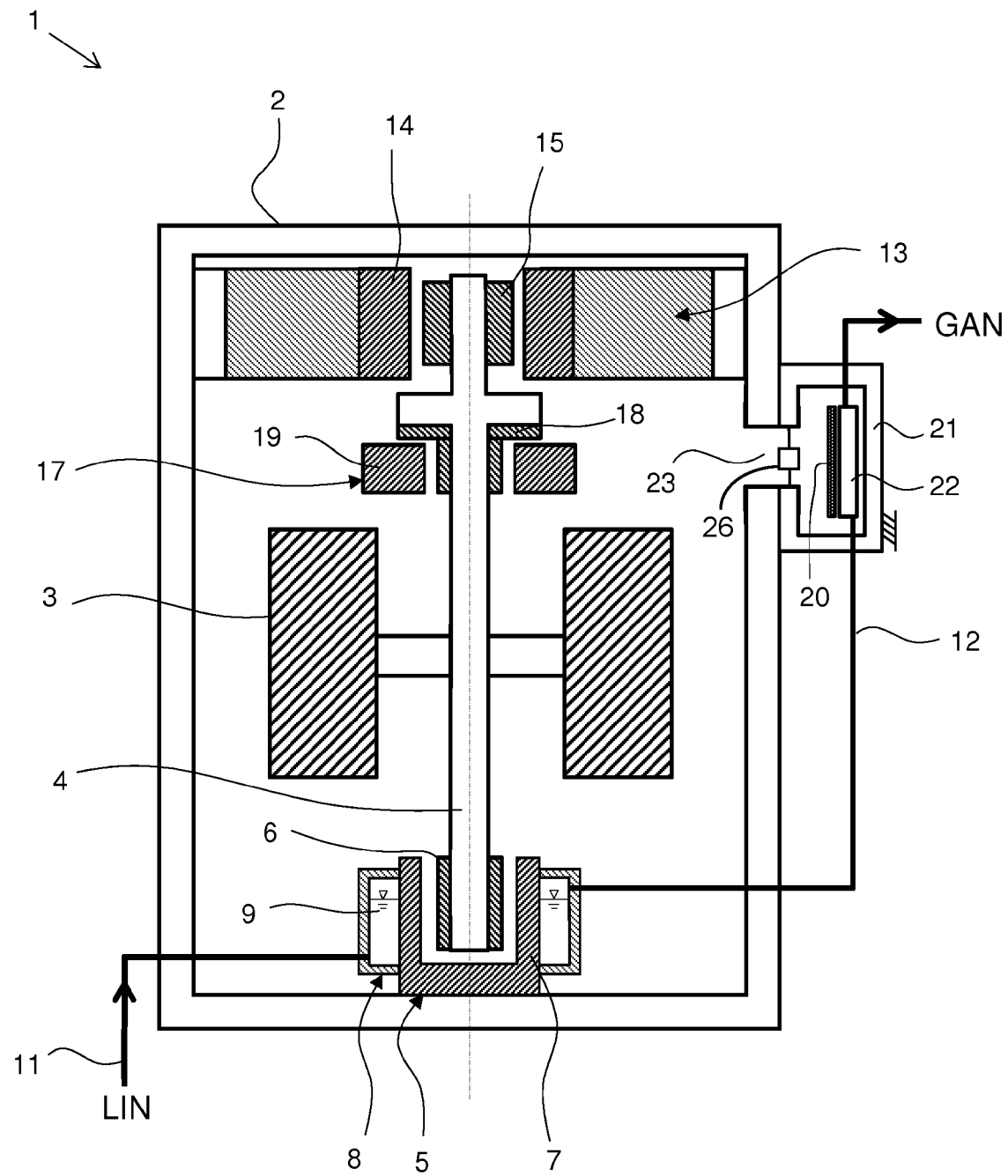

DEVICE FOR IMPROVING THE VACUUM IN THE HOUSING OF A MACHINE

CROSS-REFERENCE TO RELATED APPLICATIONS

This application is the U.S. national stage application of International Application PCT/EP2015/072895, filed Oct. 5, 2015, which international application was published on Apr. 14, 2016, as International Publication WO2016/055398 in the German language. The international application is incorporated herein by reference, in entirety. The international application claims priority to DE Patent Application No. 10 2014 015 172.7, filed Oct. 10, 2014, which is incorporated herein by reference, in entirety.

The invention relates to a device for improving a vacuum in the housing of a machine, in which a rotor, which is contactlessly mounted on at least one superconducting bearing, is arranged in a vacuum container, wherein the superconducting bearing, in order to maintain its operating state, is thermally connected to a cold source cooled by a cryogenic medium, and in which there are provided means for improving the vacuum in the vacuum container.

For generating strong magnetic fields, use is made inter alia of superconducting materials which have the characteristic of losing their electrical resistance when cooled to temperatures below their critical temperature. Owing to the development of high-temperature superconductors, which are used at temperatures close to boiling point of liquid nitrogen, it is presently possible to produce power cables, energy stores, apparatus and machines in which the costs for the necessary cooling are relatively low. In order to bring the superconducting components to a temperature below the critical temperature, they are cooled by means of a compression refrigeration machine or by contact with a cryogenic liquefied gas, in particular liquid nitrogen. Even once below the critical temperature, an unavoidable input of heat by convection, radiation or conduction makes continuous cooling necessary, which involves at least partial evaporation of a liquefied gas used for cooling.

In some machines with rapidly rotating machine elements, for example in the case of flywheel mass energy stores, superconducting materials are used in particular in order to generate magnetic fields for contactless mounting of the rotor. In the following, the term "superconducting bearing" is used for bearings of this type which, in their operating state, contactlessly mount a rotor using magnetic fields, wherein the magnetic fields are generated in coils made of a superconducting material. They are distinguished by the fact that there are no mechanical friction losses at the bearing during rotation of the rotor; they are thus suitable, in particular, for storing energy in the form of rotational energy, potentially for a long time. Losses which nonetheless arise are primarily due to friction with the surrounding atmosphere, and hence the rotating masses are expediently located in a vacuum container in which a pressure of 0.1 Pa ($10^{-3}$ mbar) or less typically prevails. This vacuum is generally created using an ordinary vacuum pump. The vacuum pump can either remain connected for the entire operating time, or is separated from the system after creation of the vacuum and closing of the vacuum container. Keeping a vacuum pump connected to the system while this is in operation leads to substantially higher operating costs, and in addition vibration produced by the pump can be transmitted to the system and impair the function of the latter. If the vacuum pump is separated from the system after creation of the vacuum, care must be taken to minimize the subsequent rise in pressure inside the vacuum container due to outgassing or ingress of ambient air into the vacuum container.

In order to realize this, WO 2013/149625 A1 proposes providing a cold surface inside the vacuum container of a flywheel mass. In that context, a surface is arranged in the housing and is cooled to temperatures below the dew point of certain constituents of the surrounding atmosphere. These constituents undergo a phase transition and freeze onto the cooled surface. This effect supports the pressure reduction of the residual gas which takes place simply due to cooling of the gas. The further immobilization of the gas fractions adhering to the cold surface in the form of solid or liquid particles causes a further pressure reduction in the overall system.

However, with this setup, reducing the pressure in the vacuum container is possible only as long as phase transitions can take place in the rarefied atmosphere of the vacuum container and at the temperatures prevailing at the cooling surface. Once all of the condensable constituents have been frozen, this approach permits no further pressure reduction in the context of residual gas consisting essentially of air gases.

The present invention therefore has the object of providing an arrangement for improving the vacuum in machines, in particular in flywheel energy stores, which operates efficiently even at very low pressures and can be realized without great apparatus complexity.

The object of the invention is achieved with a device having the features of claim 1. Advantageous embodiments are indicated in the dependent claims.

Thus, according to the invention, a device of the type mentioned in the introduction and having the purpose mentioned in the introduction is characterized in that an adsorber that is thermally connected to a cooling device is provided as the means for improving the vacuum.

The adsorber is an ordinary adsorber, as is also used for example to create and maintain an insulating vacuum in high-vacuum-insulated containers. In contrast to a cold trap, the adsorber is still capable of taking up and durably binding gas molecules, even at low operating pressures. It thus permits operating pressures between $10^{-4}$ and $10^{-5}$ bar and below, far below the pressures that can be achieved with conventional vacuum pumps. In that context, the adsorber does not require a certain working temperature; however, the adsorption process proceeds better the lower the temperature. For that reason, the adsorber is cooled using the cooling device. The cooling device can be a device operatively connected to the cooling for the superconducting bearing, or a separate cooling device. In that context, the adsorber is preferably cooled to a temperature below 0° C., preferably below −100° C.

A particularly advantageous embodiment of the invention provides that the cooling device comprises a heat exchanger which is thermally connected to the adsorber and which is fluidically connected to a discharge gas line from the cold source. Thus, evaporated coolant, previously used for cooling the superconducting bearing(s), is used as the coolant for cooling the adsorber. Although there is no longer any input of heat by electrical resistance once the operating temperature of the superconducting bearing (the operating temperature corresponds to a temperature below the critical temperature of the superconducting material used) has been reached, a certain input of heat, owing to heat radiation from the surroundings and by heat conduction via those components of the apparatus that are connected to the superconducting bearing(s), is nonetheless unavoidable. This heat input leads to evaporation of at least a small part of the cryogenic coolant used for cooling the superconducting bearing. This evaporating coolant still possesses a considerable amount of cooling power which, in this embodiment of the invention, is used for cooling the adsorption material.

The adsorber is arranged for example at any point within the vacuum container, or in a vacuum chamber that is fluidically connected to the vacuum chamber. If the adsorber is cooled by means of a cryogenic medium via a heat exchanger, the vacuum chamber is preferably provided with thermal insulation. In the context of the invention, it is furthermore also conceivable for a merely temporary connection to exist between a vacuum chamber containing the adsorber, and the vacuum container in which the rotor of the machine is arranged. In this case, the vacuum chamber can thus be fluidically separated from the vacuum container while maintaining the vacuum in the vacuum container, and the adsorber can then be removed for desorption and replaced with fresh adsorber material. This makes it possible to replace or regenerate the adsorber during running operation of the machine. A specific configuration provides for the provision of multiple vacuum chambers which can be connected to the vacuum container, which each contain an adsorber, and which can be connected to and separated from the vacuum container in alternation.

The fluidic connection between the vacuum chamber and the vacuum container is advantageously formed such that it can be closed. In that context, a valve or an airlock is preferably used for closing and opening the fluidic connection, and for example makes it possible to open the vacuum chamber for the purpose of removing or regenerating the adsorber while at the same time maintaining the vacuum in the vacuum container.

According to the invention, a cryogenic coolant, that is to say a subcooled, preferably liquefied gas, is used as the coolant for cooling the cold source and/or the adsorber. When using high-temperature superconducting materials, as are used for example in the coil types described in WO 2012031790 A1, the use of liquid nitrogen or liquid argon for maintaining the operational capability of the superconducting bearing is preferred. In order to achieve even lower temperatures, it is possible, within the scope of the invention, to supercool the liquefied gases, that is to say to bring them a temperature below their boiling point. In the case of coils made of classical superconductors such as NbTi, however, the use of liquid helium will generally be necessary.

Preferably, the device according to the invention is a machine in which the rotor has a shaft and a flywheel mass mounted thereon, as are used in particular in the context of flywheel mass energy stores.

There follows a more detailed description, with reference to the drawing, of an exemplary embodiment of the invention.

The single drawing (FIG. 1) shows a flywheel energy store according to the invention.

The machine shown in the drawing, in the exemplary embodiment a flywheel energy store 1, comprises a flywheel mass 3 which is accommodated in a vacuum container 2 and is secured to a vertical shaft 4. The lower end of the shaft 4 is mounted contactlessly in a superconducting bearing 5 and, for that purpose, is equipped with a magnetic rotor unit 6. The superconducting bearing 5 comprises a stator 7 in which are arranged superconducting coils (not shown here) for generating a magnetic field suitable for contactless mounting of the shaft 4. A cooling unit 8, which is cooled using a cryogenic medium, extends radially around the stator 7. In the exemplary embodiment shown here, in which the coils of the stator 7 consist of a high-temperature superconducting material, the cryogenic medium is in particular liquid nitrogen; if, by contrast, the coils are made of a conventional superconductor, the cryogenic medium used is preferably liquid helium. The cooling unit 8 comprises a reservoir 9 for the cryogenic medium which is in thermal contact with the superconducting coils of the stator 7. The term "reservoir" is to be understood here in a broad sense and can in particular encompass a container filled with coolant or a line conveying coolant. A coolant supply line 11 that is fluidically connected to the reservoir 9 serves for supplying liquid cryogenic medium; a gas discharge line 12 which, during proper operation of the flywheel energy store 1, is fluidically connected to a gas phase in the reservoir 9 serves for discharging evaporated gaseous medium. The flywheel energy store 1 also comprises a motor/generator 13 with a static stator 14 and a rotor 15 which is arranged on the shaft 4 and serves for introducing or extracting energy into or from the flywheel energy store 1. Below the motor/generator 13 there is arranged a magnetic bearing 17 with a rotor 18 arranged on the shaft 4 and a stator 18 that interacts therewith. This magnetic bearing 17, which is preferably a conventional active magnetic bearing, serves merely as a guide and as a backup bearing in the event of the superconducting bearing 5 failing as a consequence of a fault.

In order to create and maintain, within the vacuum container 2, a vacuum that is adequate for long-term operation of the flywheel mass energy store 1, the vacuum container 2 is first evacuated, by means of a vacuum pump which is not shown here, to a pressure of for example $10^{-3}$ mbar. An adsorber 20, which is arranged within a thermally well-insulated vacuum chamber 21 connected to the vacuum container 2, serves to further improve the vacuum. The adsorber 20 comprises a body with an outer or inner surface area that is as large as possible. Molecules outgassing from parts of the apparatus arranged within the vacuum container 2, or entering the vacuum container 2 from outside, are caught by the adsorber 20 and are bound for the duration of use of the flywheel energy store 1. This permits a marked improvement of the vacuum in the vacuum container 2, to a value of for example $10^{-4}$ to $10^{-5}$ mbar and below. The adsorption effect is further improved by cooling. For this reason, the adsorber 20 is thermally connected to the gas discharge line 12 via a heat exchanger 22. The cooling makes use of the fact that, even after reaching a temperature below the critical temperature of the superconducting material used in each case in the stator 7, radiation and heat conduction mean that there is a continuous, albeit minor, input of heat into the superconducting bearing 5, which causes part of the coolant present in the reservoir 9 to evaporate. The cold content of the cryogenic coolant which evaporates and is discharged via the gas discharge line 12 is at least partially used in the heat exchanger 22 for cooling the adsorber 20. Thus, the adsorber 20 is cooled without having its own cooling system.

The vacuum chamber 21 and the vacuum container 2 are fluidically connected to one another via a connecting line 23 which, when required, can be closed off using a device 26 such as an airlock or a valve, thus maintaining the vacuum in the vacuum container 2. Then, the vacuum chamber 21 is opened by means of an airlock (not shown here), and the adsorber 20 can be removed. It is thus possible to replace the adsorber 20 during operation of the flywheel mass energy store 1, should this be necessary in order to regenerate the relevant adsorber.

Furthermore, the adsorber 20 can also be arranged within the vacuum container 2, this dispensing with a separate vacuum chamber. However, in this case the vacuum container 2 would have to be vented in order to be able to replace the adsorber 20.

LIST OF REFERENCE SIGNS

1. Flywheel energy store
2. Vacuum container
3. Flywheel mass
4. Shaft
5. Superconducting bearing
6. Rotor unit
7. Stator
8. Cooling unit
9. Reservoir
10. -
11. Coolant supply line
12. Gas discharge line
13. Motor/generator
14. Stator
15. Rotor
16. -
17. Magnetic bearing
18. Rotor
19. Stator
20. Adsorber
21. Vacuum chamber
22. Heat exchanger
23. Connecting line

The invention claimed is:

1. A device for improving a vacuum in a housing of a machine, in which a rotor, which is contactlessly mounted on at least one superconducting bearing, is arranged in a vacuum container, wherein the superconducting bearing, in order to maintain its operating state, is in thermal contact with a reservoir supplied with a liquefied cryogenic medium, and in which there are provided means for improving the vacuum in the vacuum container,
wherein an adsorber that is thermally connected to a cooling device is provided as the means for improving the vacuum; and
wherein the cooling device comprises a heat exchanger which is thermally connected to the adsorber and which is fluidically connected to a discharge gas line for evaporated cryogenic medium from the reservoir.

2. The device as claimed in claim 1, wherein liquid nitrogen or a liquefied noble gas is used as the cryogenic medium in the reservoir.

3. The device as claimed in claim 2, wherein the rotor has a shaft and a flywheel mass mounted thereon.

4. The device as claimed in claim 1, wherein the rotor has a shaft and a flywheel mass mounted thereon.

5. The device as claimed in claim 4, wherein liquid nitrogen or a liquefied noble gas is used as the cryogenic medium in the reservoir.

6. The device as claimed in claim 1, wherein the adsorber is arranged in a vacuum chamber that is fluidically connected to the vacuum container.

7. The device as claimed in claim 6, wherein the fluidic connection between the vacuum chamber and the vacuum container can be closed.

8. The device as claimed in claim 7, wherein liquid nitrogen or a liquefied noble gas is used as the cryogenic medium in the reservoir.

9. The device as claimed in claim 7, wherein the rotor has a shaft and a flywheel mass mounted thereon.

10. The device as claimed in claim 6, wherein liquid nitrogen or a liquefied noble gas is used as the cryogenic medium in the reservoir.

11. The device as claimed in claim 10, wherein the rotor has a shaft and a flywheel mass mounted thereon.

12. The device as claimed in claim 6, wherein the rotor has a shaft and a flywheel mass mounted thereon.

13. A device for improving a vacuum in a housing of a machine, in which a rotor, which is contactlessly mounted on at least one superconducting bearing, is arranged in a vacuum container, wherein the superconducting bearing, in order to maintain its operating state, is in thermal contact with a reservoir supplied with a liquefied cryogenic medium, the device comprising:
a heat exchanger;
an adsorber in fluid communication with the vacuum container and thermally connected to the heat exchanger; and
a discharge gas line that conveys evaporated cryogenic medium from the reservoir to the heat exchanger.

14. The device of claim 13, further comprising a vacuum chamber fluidically connected to the vacuum container, wherein the adsorber is arranged in the vacuum chamber.

15. The device of claim 14, further comprising one of a valve and an airlock situated in the fluidic connection between the vacuum chamber and the vacuum container, the one of the valve and the airlock configured to close the fluidic connection between the vacuum chamber and the vacuum container.

16. The device as claimed in claim 13, wherein liquid nitrogen or a liquefied noble gas is used as the cryogenic medium in the reservoir.

17. A device for improving a vacuum in a housing of a machine, in which a rotor, which is contactlessly mounted on at least one superconducting bearing, is arranged in a vacuum container, wherein the superconducting bearing, in order to maintain its operating state, is in thermal contact with a reservoir supplied with a cryogenic medium, and in which there are provided:
an adsorber that is thermally connected to a cooling device;
wherein the cooling device comprises a heat exchanger which is thermally connected to the adsorber and which is fluidically connected in series with the reservoir.

18. The device of claim 17, wherein at least some of the cryogenic medium in the reservoir is liquefied, and wherein the heat exchanger receives evaporated cryogenic medium from the reservoir via a discharge gas line.

19. The device of claim 17, wherein the fluidic connection between the heat exchanger and the reservoir is such that the heat exchanger is situated downstream of the reservoir.

20. The device of claim 17, wherein the cryogenic medium in the reservoir is liquid nitrogen or a liquefied noble gas.

* * * * *